Figure 1:
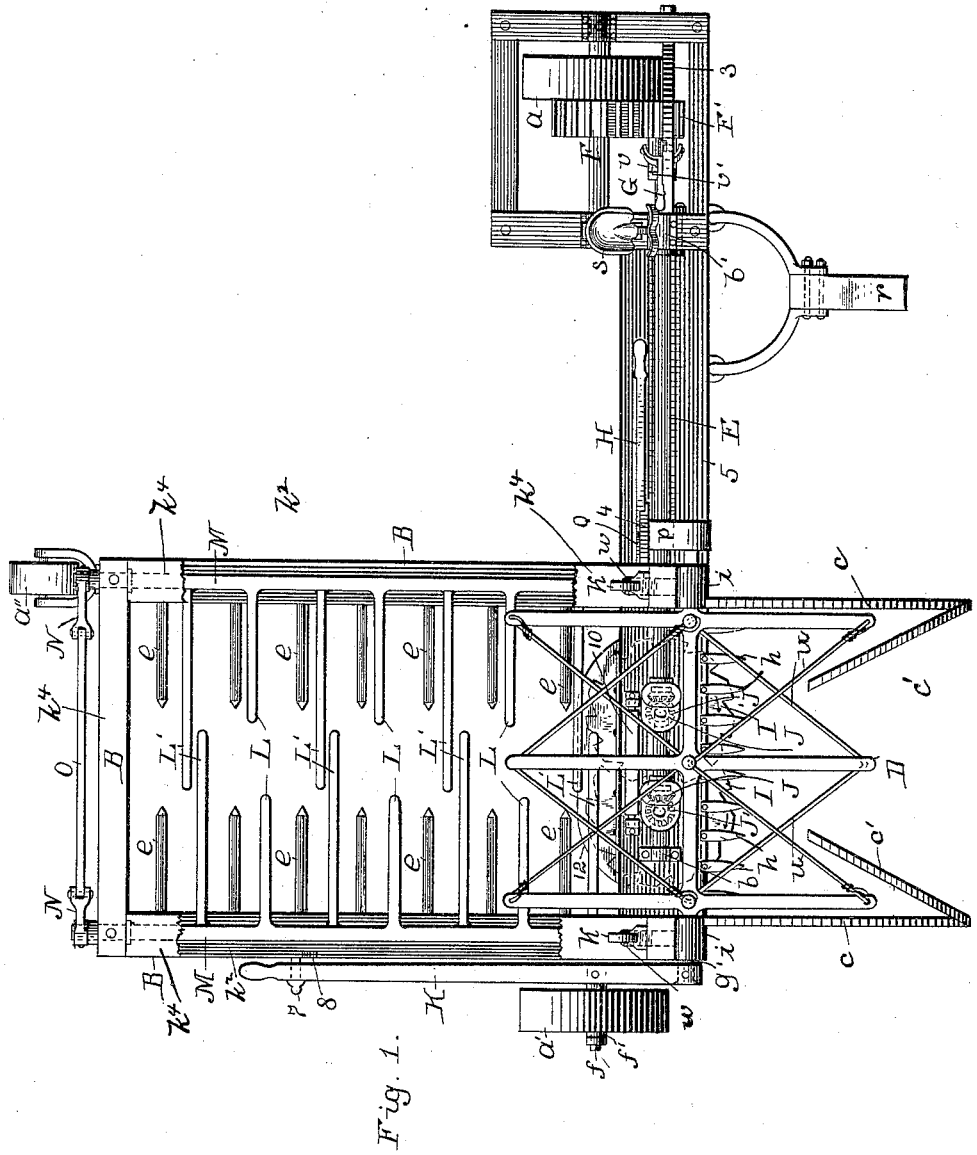

(No Model.) 3 Sheets—Sheet 1.

J. ARMSTRONG.
CORN HARVESTER.

No. 409,443. Patented Aug. 20, 1889.

Witnesses
F. G. Fischer
A. A. Higdon

Inventor
John Armstrong
By his Attorney J. C. Higdon (No Model.) 3 Sheets—Sheet 2.
J. ARMSTRONG.
CORN HARVESTER.
No. 409,443. Patented Aug. 20, 1889.
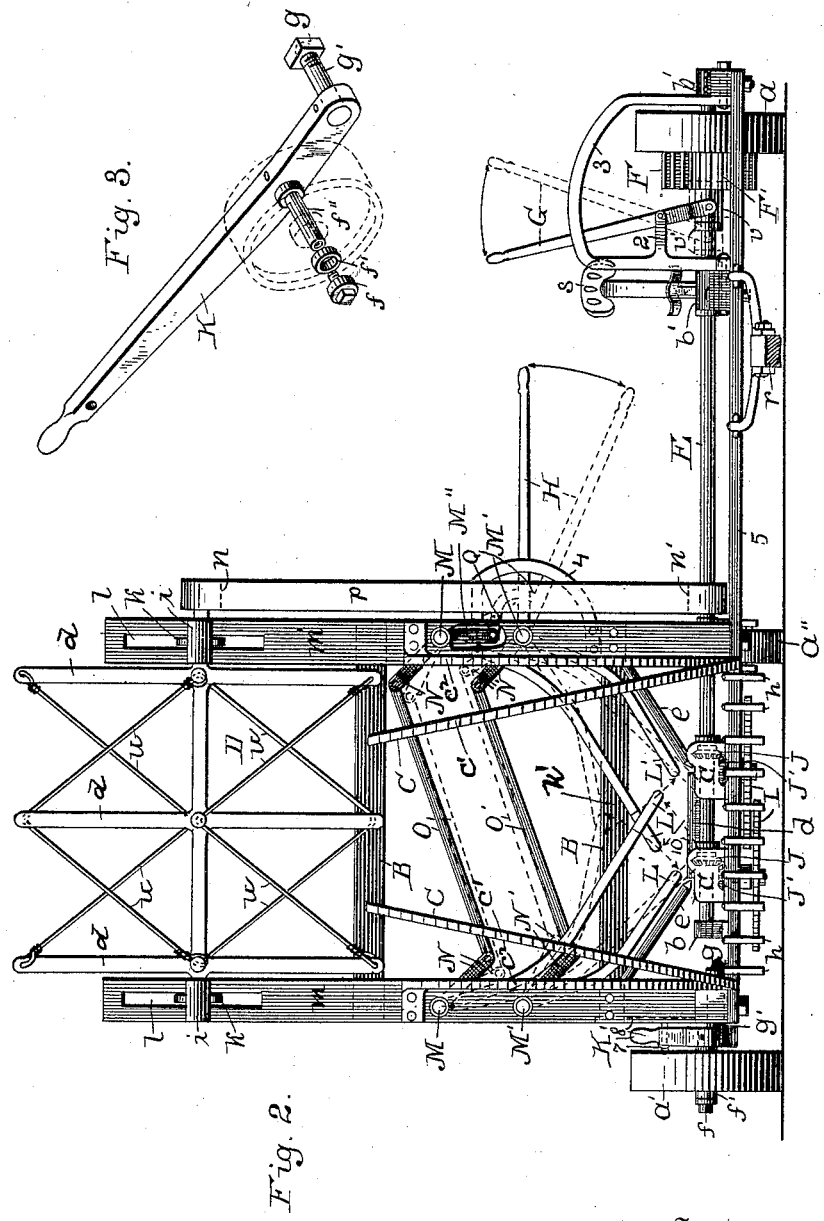
Witnesses,
F. G. Fischer
A. A. Higdon
Inventor
John Armstrong
By his Attorney J. C. Higdon

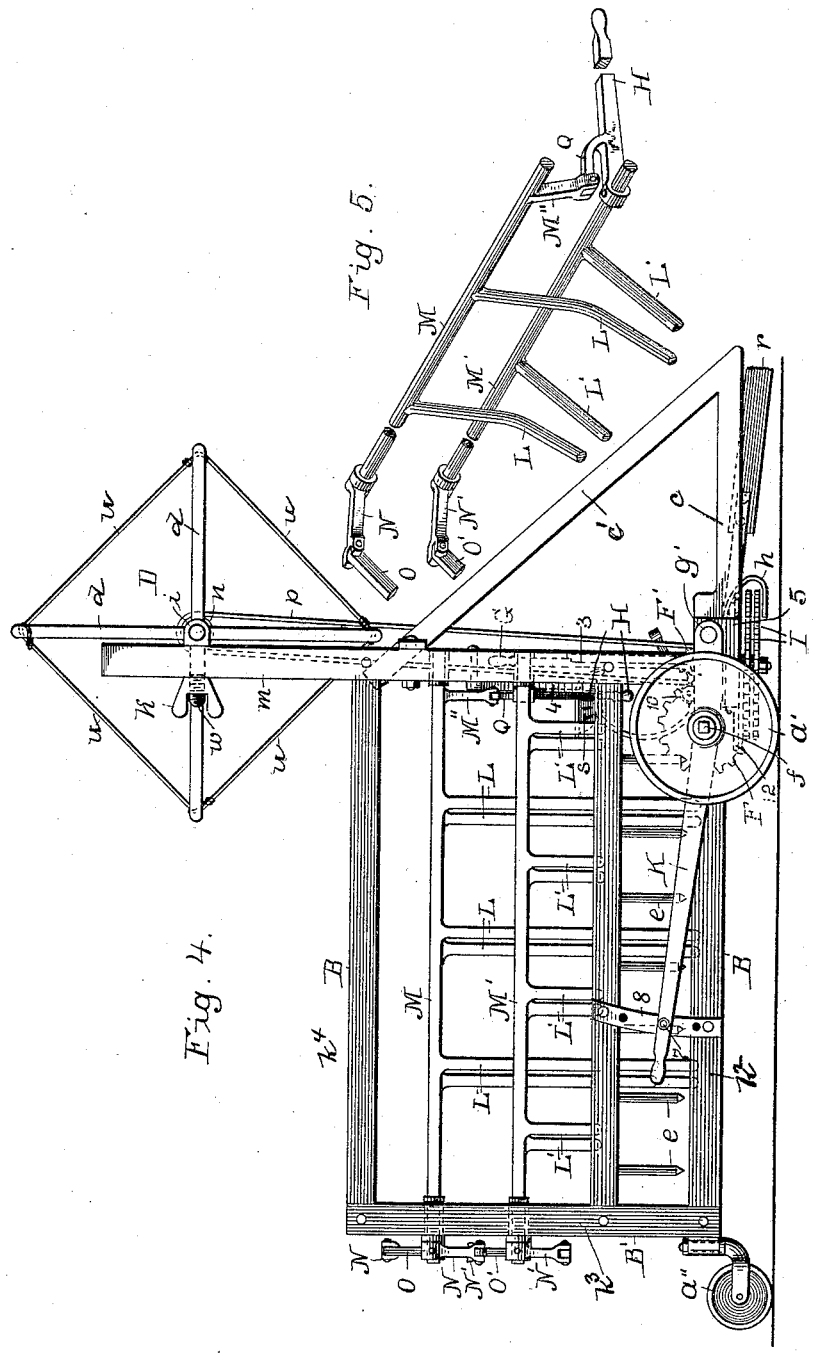

UNITED STATES PATENT OFFICE.

JOHN ARMSTRONG, OF VINE CREEK, KANSAS.

CORN-HARVESTER.

SPECIFICATION forming part of Letters Patent No. 409,443, dated August 20, 1889.

Application filed March 7, 1889. Serial No. 302,264. (No model.)

*To all whom it may concern:*

Be it known that I, JOHN ARMSTRONG, of Vine Creek, Ottawa county, Kansas, have invented certain new and useful Improvements in Corn-Harvesters, of which the following is a full, clear, and exact description, reference being had to the accompanying drawings, forming a part hereof.

This invention relates to certain improvements in corn-harvesters, more especially that class termed "single-row" corn-harvesters; and it consists of the novel combination of parts, including their construction, as will appear further on from the following description and accompanying illustrations, in which—

Figure 1 is a plan view of my improved corn-harvester. Fig. 2 is a front elevation of the same, showing the tongue in section. Fig. 3 is a detached perspective view of the knife-carrying bar, adjusting-lever, and its adjunctive features or parts, including one of the transporting-wheels shown in dotted lines. Fig. 4 is a side elevation of my corn-harvester, and Fig. 5 is a detailed broken perspective view of the stalk receiving and discharging arms and their actuating-lever.

In the embodiment of my invention I employ a suitable frame B, which is borne by the wheels $a$ $a'$ $a''$, said frame consisting of the base or horizontal portion having front and rear bars $k'$ and side bars $k^2$, and uprights $m$, $m'$, and $k^3$, connected at their upper ends by the bars $k^4$. The shaft E is supported in boxes $b$ $b'$ secured upon the frame B, and carries a sliding or endwise-movable pinion F', which gears with a similar pinion F upon a supplementary shaft carrying the wheel $a$. The slipping of the pinion F' into and out of gear with the pinion or wheel F is effected by a lever G, connected to a sleeve or box $v$ upon the flanged hub $v'$ of the pinion F'. Said lever is suitably pivoted in an arm 2 of a frame 3, supported upon the frame B.

The wheel $a'$ is carried by a hand-lever K, pivoted by means of a pivot-bolt $g$ $g'$, connected to the frame B. The lever K carries a journal $f''$, upon which is borne the wheel $a'$, and which receives a holding screw-plug $f$, between which and the wheel $a'$ is interposed a collar or ring $f'$. This arrangement permits of the vertical adjustment of the end of the frame B, carrying the knives or cutters presently described as required in varying the height of the cut. The lever K has a pin 7, which engages a serially-apertured curved bar 8, applied to the frame B, for holding the lever at the desired height or point of adjustment.

At the front end of the frame B are the angular guide-wings C C, one applied to each side thereof, for conducting or directing the standing corn or stalks to and bringing them more fully under the action of the reel. These wings consist each of a horizontal arm $c$, an upright arm $c^2$, connected thereto at the rear end and affixed at its upper end to the upright $m$, and the inclined arm $c'$, integral at its lower end with the front end of the said horizontal arm and inclining upwardly, rearwardly, and inwardly toward its free end.

D is the reel, which comprises a series of radial arms connected by a net-work of crossing rods $u$, and is mounted between uprights $m$ at the front end of the frame B upon a shaft supported in boxes $i$, with which are integrally formed screw-bolts $w$, passed through vertical slots $l$ $l$ in said uprights $m$, and upon which are screwed or fitted thumb-nuts $k$. This arrangement permits of the vertical adjustment of the reel according to the height of the corn or stalks to be operated upon. This reel is composed of a central and two side series of radial arms $d$, and the rods $u$ are connected to the outer ends of said arms, whereby all of the rods are arranged in the plane of the periphery of the reel. The rods are arranged in pairs, and the two members of each pair diverge in the direction of the rotation of the reel, whereby the tops of the cornstalks are drawn toward the center of the reel. The rear adjacent ends of each pair of rods are affixed to one of the central radial arms, and the front ends of the same are attached to opposite side arms in advance of the said central arm, or in the direction of the rotation of the reel. The reel is revolved or driven by a belt $p$, encompassing a pulley $n$ on its shaft and a pulley $n'$ on the driving-shaft E.

I I are the cutters or knives, which are incased upon their rear side, as at 12, rotary in their action, and each secured upon a short vertical shaft supported in a bar 5 of the frame B, carrying at its upper end a horizontal beveled pinion J', gearing with a similar vertical pinion J upon the driving-shaft E, which gearing is inclosed in boxes C C. To the bar 5 is applied, in front of the cutters I I, a series of guards $h\,h$ for the protection of the latter.

Just in rear of the incased gearing and the shaft E is supported or disposed upon the bar 5 a roller 10, to effect the carrying of the cut stalks or corn thereover without interference with the action of the shaft and to prevent the lodgment of the stalks upon the latter.

L L' are two series of arms, each series extending inwardly, and having their free ends normally interlapping each other. These arms are arranged within the frame B, and receive the falling stalks lodged therein by the action of the reel, and effect the discharge and proper disposition of the same upon the ground. Each series of the arms L L', of which there are two applied upon each side of the frame, one above the other, are cast or formed with a common shaft or rod, each of the opposite upper series projecting from a shaft M, while each of the opposite lower series project from a shaft M'. The shaft M of one series of said arms has applied or fixed to it a hand-lever H, while said lever is connected to the upper shaft M of a coincident series of arms by means of a short arm Q, projecting from said lever and jointed to an arm M'', projecting from the said shaft M. To the opposite ends of these shafts are applied arms N N', respectively pivoted to connecting bars or rods O O', in turn connected to like arms N N' of the shafts M M' upon the opposite side of the frame B. It will be seen that by this arrangement not only does the hand-lever H serve to operate the several series of arms, but that while the lower series are delivering their load or contents through the proper manipulation of the lever the upper series will be brought into such position as to receive the stalks then being cut. The stalks received by the upper series of arms are dropped upon the lower series of arms as the latter are returned to their former or normal position, the upper series of arms then separating.

$e\,e$ are the centering or guiding arms, applied or fixed to the opposite side of the frame below the lower series of arms L', directing the discharge of the stalks as they leave the latter centrally of the machine.

$r$ is the draft pole or tongue of the machine, and $s$ is the driver's or operator's seat, suitably or conveniently positioned with relation to the levers G and H, which are the only ones that require adjustment at stated intervals during the operation of the machine.

The transporting-wheel $a''$ is a caster-wheel, and is mounted in a swiveled bracket at the rear end of the frame B, whereby it may turn freely to accommodate the movement of the harvester.

Having thus described my invention, what I claim as new, and desire to secure by Letters Patent, is—

1. In a corn-harvester, the combination, with the supporting-frame carrying the cutters, of the upper series of swinging arms affixed to rock-shafts M at opposite sides of the said frame and connected together for simultaneous operation, the lower series of swinging arms affixed to rock-shafts M', respectively, below the rock-shaft M, the operating-lever connected to said shafts to operate them simultaneously to alternately receive and deposit the stalks, and the centering and guiding arms arranged below the swinging arms to receive the stalks therefrom and deposit them in bundles, substantially as specified.

2. In a corn-harvester, the combination, with gathering-arms having upwardly and rearwardly inclined arms which converge toward their free ends, of the reel arranged above said gathering-arms and provided with inclined convergent rods to engage the upper ends of the stalks and draw them together between said arms, substantially as and for the purpose specified.

In testimony whereof I affix my signature in presence of two witnesses.

JOHN ARMSTRONG.

Witnesses:
  F. G. FISCHER,
  A. A. HIGDON.